(12) United States Patent
Dempo (10) Patent No.: US 9,331,932 B2
(45) Date of Patent: May 3, 2016

(54) NETWORK SYSTEM (75) Inventor: Hiroshi Dempo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 330 days.

(21) Appl. No.: 13/255,989

(22) PCT Filed: Mar. 15, 2010

(86) PCT No.: PCT/JP2010/054749
§ 371 (c)(1),
(2), (4) Date: Sep. 12, 2011

(87) PCT Pub. No.: WO2010/107105
PCT Pub. Date: Sep. 23, 2010

(65) Prior Publication Data
US 2012/0002549 A1 Jan. 5, 2012

(30) Foreign Application Priority Data
Mar. 19, 2009 (JP) ................. 2009-068900

(51) Int. Cl.
*H04L 12/56* (2006.01)
*H04L 12/729* (2013.01)
(Continued)

(52) U.S. Cl.
CPC .............. *H04L 45/125* (2013.01); *H04L 45/38* (2013.01); *H04Q 9/00* (2013.01); *H04Q 2209/10* (2013.01); *H04Q 2209/40* (2013.01); *H04Q 2209/82* (2013.01); *H04Q 2209/845* (2013.01)

(58) Field of Classification Search
USPC ........... 709/226; 726/2, 21, 36; 713/150, 163, 713/181; 380/255, 264, 276
See application file for complete search history.

(56) References Cited

U.S. PATENT DOCUMENTS

| 6,954,775 | B1 | 10/2005 | Shanklin et al. | |
|---|---|---|---|---|
| 7,302,494 | B2 * | 11/2007 | Hayashi et al. | 709/239 |
| 7,860,917 | B2 * | 12/2010 | Moriwaki | 709/201 |

(Continued)

FOREIGN PATENT DOCUMENTS

| JP | 2007156779 A | 0/2007 |
|---|---|---|
| JP | 2003203088 A | 7/2003 |

(Continued)

OTHER PUBLICATIONS

International Search Report for PCT/JP2010/054749 mailed May 11, 2010.

(Continued)

*Primary Examiner* — Jason K. Gee
*Assistant Examiner* — Sharif E Ullah (57) ABSTRACT

After sensor nodes are deployed, when an edge node accommodating individual sensor nodes has entered a high-load state, the load is distributed to a low-load edge node receiving the same semantic information.

A sensor network system comprises a sensor node for generating semantic information by applying sensed numerical data to a defined information format, a broker node for transferring the semantic information generated by the sensor node, and the server node for registering a filter condition for semantic information to be acquired, and, when the broker node accommodating the sensor node has entered a high-load state, searches for another broker node which is in a low-load state and is capable of transferring the semantic information which has been transferred by the high-load broker node, and switches the accommodating relationship of the sensor node from the high-load broker node to the low-load broker node.

14 Claims, 7 Drawing Sheets

(51) Int. Cl.
*H04L 12/721* (2013.01)
*H04Q 9/00* (2006.01)

(56) References Cited

U.S. PATENT DOCUMENTS

| | | | |
|---|---|---|---|
| 2004/0153525 A1* | 8/2004 | Borella | 709/217 |
| 2006/0143439 A1 | 6/2006 | Arumugam et al. | |
| 2007/0281708 A1* | 12/2007 | Bakhuizen et al. | 455/450 |
| 2008/0031139 A1 | 2/2008 | Muro et al. | |
| 2008/0212504 A1* | 9/2008 | Venkataraman et al. | 370/310 |

FOREIGN PATENT DOCUMENTS

| | | |
|---|---|---|
| JP | 2004080433 A | 3/2004 |
| JP | 2005284341 A | 10/2005 |
| JP | 2007179243 A | 7/2007 |

OTHER PUBLICATIONS

European Search Report for ER Application No. 10753596.5 dated on Mar. 20, 2015 with English Translation.

Sean Rooney et al: "Techniques for integrating sensors into the enterprise network", IEEE Transaction on Network and Service Management, IEEE, US, vol. 1, No. 1, Jan. 1, 2006. pages 43-52, XP011253109, ISSN: 1932-4537, p. 1-p. 4.

* cited by examiner

NETWORK SYSTEM

TECHNICAL FIELD

The present invention relates to a network system, and more particularly to a sensor network system, a broker node, a sensor node, a load-balancing method, a program, and a recording medium, utilizing semantic information generated by the sensor nodes connected to network.

BACKGROUND ART

In recent years, an information processing system to visualize the various states in the real space by the use of sensor nodes have been investigated. In such a system, a large number of sensor nodes are deployed in the real space, and the data sensed by each sensor node is sent to a server node. Then, the set of these data is dealt with by the server as the visualized information of the situation of the real space which is the sensing target.

For example, patent document 1 shows the realization of more advanced sensing and visualization of the real space and situation-dependent type services based upon such technologies, which is achieved by appending semantic information in addition to merely acquiring numerical data.

Further, there is an information routing method utilizing the above-mentioned semantic information. According to patent document 2, a path for receiving semantic information is set up by propagating the filter condition of the semantic information registered by a certain service entity to a semantic-information router and a semantic-information switch that constitute a semantic-information network. Here, the filter condition is the semantic information set as the semantic information which a router can relay, and a router to which a lot of kinds of filter conditions are set relays a lot of semantic information. And when another service entity has emitted certain semantic information, a filter process with a registered filter condition is executed in the above-described semantic-information router and semantic-information switch. Then, only the semantic information matching the filter condition is delivered to the service entity which set the filter condition.

RELATED ART DOCUMENTS

Patent Documents

Patent document 1: Japanese Patent Application Laid-Open No. 2007-156779
Patent document 2: Japanese Patent Application Laid-Open No. 2003-203088

DISCLOSURE OF INVENTION

Problem to Be Solved by the Invention

When the events in the real space are sensed by the use of a sensor network system, the case in which sensor nodes are installed at multiple sites for one event is assumed. Referring to the model of patent document 2, one template (type) of semantic information is defined for a certain event, and one substance of semantic information is configured by substituting the numerical data detected by multiple sensor nodes into the template.

In such a sensor network system, there is a problem that the load balancing over the edge nodes which accommodate individual sensor nodes is difficult. In the above-mentioned example, the model in which one wireless base station accommodates a plurality of sensor nodes is presented. These wireless base station and sensor nodes are deployed in a fixed manner, and their relation is fixed. However, the frequency of occurrence of the sensing data generated by the sensor nodes and the semantic information added to it varies with the sites where the sensor nodes are deployed. That is, when one sensing target, the sensing data relevant to it and the semantic information added to the data are specified, the sensor node installed at the site where a large number of changes in the situation occur generates larger amount of sensor data and semantic information. On the other hand, the sensor node installed at the site where the situation changes a little generates smaller amount of sensor data and semantic information than the former. Consequently, there exists a base station whose load can become high and also a base station whose load is relatively low.

Considering the above-described situation, the present invention is intended to enable the edge node to distribute its load among other low-load edge nodes, even in the case of the amount of semantic information generated by each sensor node connected to network increases and thereby the load of the edge node which accommodates those sensor nodes becomes high.

Technical Solution

As an aspect of the present invention, a sensor network system includes a sensor node which generates semantic information by applying sensed numerical data to a defined information format, a broker node which transfers the semantic information generated by the sensor node, and a server node which registers a filter condition for acquired semantic information in the broker node, wherein, when the broker node which accommodates the sensor node becomes a high-load state, by the use of the filter condition which is registered, the sensor network system searches for another broker node which is in a low-load state and is capable of transferring the semantic information which has been transferred by the high-load broker node, and switches the accommodation relationship with the sensor node from the high-load broker node to the low-load broker node.

As an aspect of the present invention, a broker node constitutes a sensor network system together with a sensor node for generating semantic information by applying sensed numerical data to a defined information format, and with a server node for registering a filter condition for acquired semantic information in a broker node, wherein the broker node includes an acquired-information discrimination means for discriminating the content of information acquired from other nodes, a filter-condition management means for registering a filter condition, when the acquired-information discrimination means discriminates the content of acquired information as control information relevant to filter-condition registration, and a load-balancing processing means for sending control information relevant to load-balancing to other broker nodes when a high-load state has occurred, and for performing a load-balancing process of making the sensor node switch the sending destination of the generated semantic information, by searching for another low-load-state broker node having the same filter condition as that of the high-load broker node by the use of the filter condition which the filter-condition management means registered, when the acquired-information discrimination means discriminates the content of acquired information as control information relevant to load-balancing.

As an aspect of the present invention, a sensor node generates semantic information by applying sensed numerical data to a defined information format, and constitutes a sensor network system together with a broker node which transfers the generated semantic information and with a server node which registers a filter condition for acquired semantic information in the broker node, and, when instructed by high-load broker node which is presently accommodated, about the connection information to another broker node which is in a low-load state and is capable of transferring the semantic information which has been transferred by the high-load broker node, and is searched for by the use of the filter condition which is registered, and about the semantic information to be the subject of the change of connection destination, the sensor node switches the sending destination of the semantic information from the high-load broker node to the low-load broker node.

As an aspect of the present invention, a method of load-balancing utilized in a sensor network system includes a sensor node which generates semantic information by applying sensed numerical data to a defined information format, a broker node which transfers the semantic information generated by the sensor node, and a server node which registers a filter condition for acquired semantic information in the broker node, and, when the broker node which accommodates the sensor node becomes a high-load state, by the use of the filter condition which is registered, the sensor network system searches for another broker node which is in a low-load state and is capable of transferring the semantic information which has been transferred by the high-load broker node, and switches the accommodation relationship with the sensor node from the high-load broker node to the low-load broker node.

As an aspect of the present invention, a program utilized in a sensor network system includes a sensor node which generates semantic information by applying sensed numerical data to a defined information format, a broker node which transfers the semantic information generated by the sensor node, and a server node which registers a filter condition for acquired semantic information in the broker node, and, the program makes a computer in the broker node, when the broker node which accommodates the sensor node becomes a high-load state, by the use of the filter condition which is registered, execute the steps of searching for another broker node which is in a low-load state and is capable of transferring the semantic information which has been transferred by the high-load broker node, and of switching the accommodation relationship with the sensor node from the high-load broker node to the low-load broker node.

Effect of the Invention

The present invention enables the edge node to distribute its load among other low-load edge nodes, even in the case of the amount of semantic information generated by each sensor node connected to network increases and thereby the load of the edge node which accommodates those sensor nodes becomes high.

EXEMPLARY EMBODIMENT

Figure 1A:
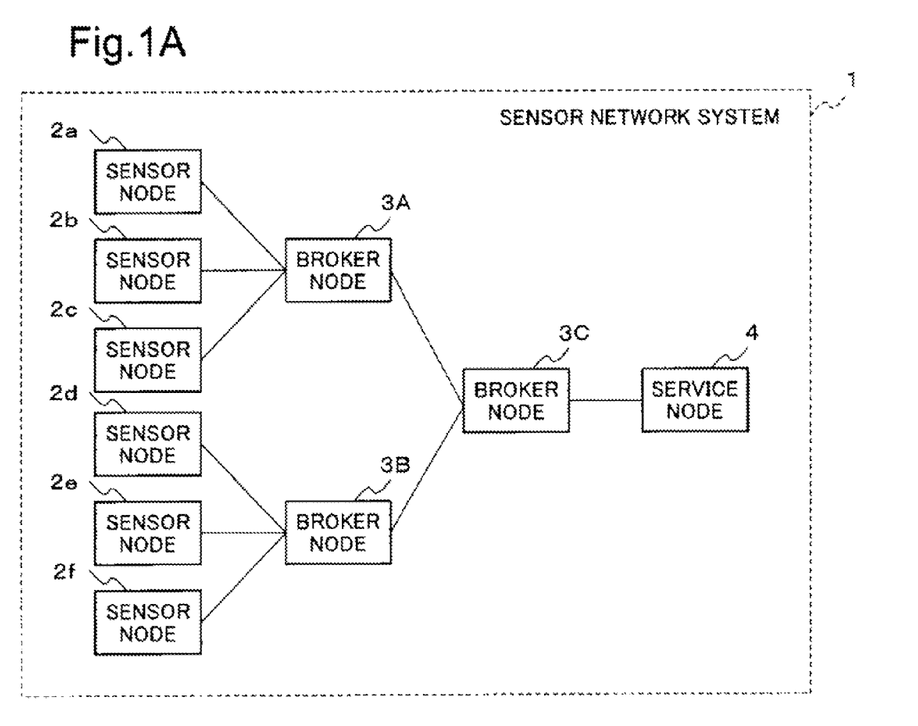
FIG. 1A is a diagram showing a sensor network system according to a first exemplary embodiment of the present invention.

The present invention is a sensor network system which performs a load balancing over the broker nodes (edge nodes) which accommodate sensor nodes, in the case where the sensing data measured by a large number of sensor nodes are integrated to a server located in the network.
[The First Exemplary Embodiment]
FIG. 1A is a configuration diagram showing a sensor network system of a first embodiment of the present invention.
A sensor network system 1 includes sensor nodes 2a-2f generating semantic information by applying sensed numerical data to a defined information format, and broker nodes 3A-3C transferring the semantic information generated by the sensor nodes 2a-2f. The sensor network system 1 further includes a service node 4 as a server node registering a filter condition for acquired semantic information in the broker node 3A-3C.

When a broker node which accommodates the sensor nodes becomes a high-load state, the sensor network system 1 searches for another broker node which is in a low-load state and is capable of transferring the semantic information which has been transferred by the high-load broker node, by the use of the filter condition which is registered. Then, it switches the accommodation relationship with the sensor node from the high-load broker node to the low-load broker node.

Figure 1B:
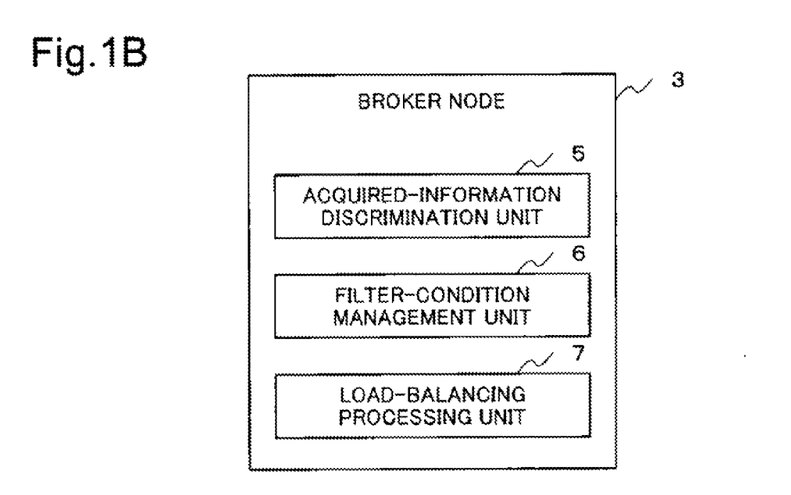
FIG. 1B is a configuration diagram of a broker node of a sensor network system according to a second exemplary embodiment of the present invention.

In this embodiment, when the load of an edge node becomes high due to the increase in the amount of the semantic information generated by a sensor node accommodated by the edge node, the transfer destination for the flow of the semantic information generated by the sensor node is switched to another edge node which is in a low-load state. In this way, the load is balanced among the edge nodes, and consequently, it becomes possible to reduce the load of the edge node accommodating the sensor node generating huge amount of semantic information.
[The Second Exemplary Embodiment]
FIG. 1B is a diagram showing the configuration of broker nodes 3A-3C in the sensor network system 1 shown in FIG. 1A. This broker node includes an acquired-information discrimination unit 5, filter-condition management unit 6 and load-balancing processing unit 7.

The acquired-information discrimination unit 5 discriminates the content of the information acquired from other nodes. The filter-condition management unit 6 performs a registration of filter conditions, when the content of the acquired information is recognized by the acquired-information discrimination unit 5 as the information relevant to the registration of filter condition. The load-balancing processing unit 7 sends control information relevant to a load balancing to other broker nodes, when its own node has entered a high-load state. Further, it searches for low-load broker nodes holding a filter condition identical to that held by the high-load broker node, utilizing the filter condition registered in the filter-condition management unit 6, when the content of the acquired information is recognized by the acquired-information discrimination unit 5 as the information relevant to the registration of filter condition. Then, it instructs a switching of the sending destination of the semantic information generated at the sensor node causing the increase of the load to a low-load broker node.

Here, the sensor node causing the high-load state is identified by the use of the semantic information generated by individual sensor node. Also in relation to the semantic information generated by sensor nodes, a low-load broker node is detected by searching for the broker nodes accommodating a sensor node generating the same kind of semantic information.

In this embodiment, the broker node includes the acquired-information discrimination unit, filter-condition management unit and load-balancing processing unit, and puts them in charge of executing respective processes according to the load situation of the broker node and the content of the information to be acquired.

[The Third Exemplary Embodiment]

Figure 2:
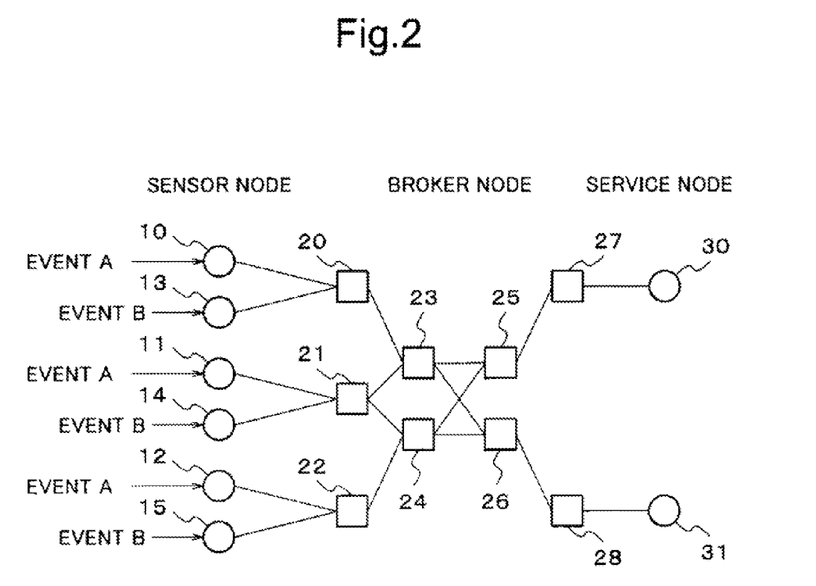
FIG. 2 is a diagram showing the configuration of a sensor network system according to a first exemplary embodiment of the present invention.

FIG. 2 is a diagram showing the configuration of a sensor network system according to the third embodiment of the present invention. In FIG. 2, the sensor network system according to the third embodiment comprises sensor nodes 10-15, broker nodes 20-28 and service nodes 30 and 31. Among the sensor nodes 10-15, the sensor nodes 10-12 perform the sensing of event A, and the sensor nodes 13-15 performs the sensing of event B. While the relationship between the event to be sensed and the sensor node is expressed here in one to one relation for simplicity, it may be such that one sensor node senses a plurality of events.

The sensor nodes 10-15 sense the event A or event B at the sites they are installed, and generate the numerical data of the sensing target. Events A and B include, for example, the environmental information such as temperature, rainfall amount and carbon dioxide concentration, the number of vehicle passing the installation sites, and furthermore the information on the operation and the load of a computer system and a network system.

Semantic-information templates are prepared for events A and B in advance, and one piece of semantic information is generated by implementing the above-mentioned numerical data to the semantic-information template. For example, if one piece of numerical data is sensed every one second and one piece of semantic information is generated for each piece of the sensing data, one piece of semantic information is generated every one second.

There are also other methods for generating semantic information. There is a method wherein a threshold value for event A is preset at the sensor node 10-12, and semantic information is generated when there has occurred a change of the state from below the threshold value to above the threshold value and vice versa. Here, the number of the threshold values is not limited to one. The method is similarly applied to event B.

The service node 30 is the recipient of the semantic information on event A, and the service node 31 is the recipient of the semantic information on event B. The service nodes 30 and 31 generate a filter condition to receive only the semantic information they need to, and register it in the broker nodes 27 and 28, respectively. This filter condition is propagated to other broker nodes 20-26 by, for example, a flooding process.

When transferring the filter condition to neighboring broker nodes, the broker nodes 20-28 add the information of their own nodes. This information is utilized as the information on the transfer destination for transferring semantic information, when the neighboring broker nodes received the semantic information matching the filter condition.

There is also an integration-type propagation of the semantic information, as a more advanced method. In this method, when a plurality of filter conditions are set for one event, the semantic-information router 20-28 detect the set filter conditions in terms of output ports. Further, it is a model wherein it is defined that the propagation of semantic information is performed by the use of the port holding larger number of filter conditions (capable of transferring multiple kinds of event information), among the ports holding the filter conditions relevant to the corresponding semantic information, and the propagation using the port holding smaller number of filter conditions is stopped.

By the above-mentioned process, delivery paths for transferring semantic information are set over the broker nodes 20-28.

Figure 3:
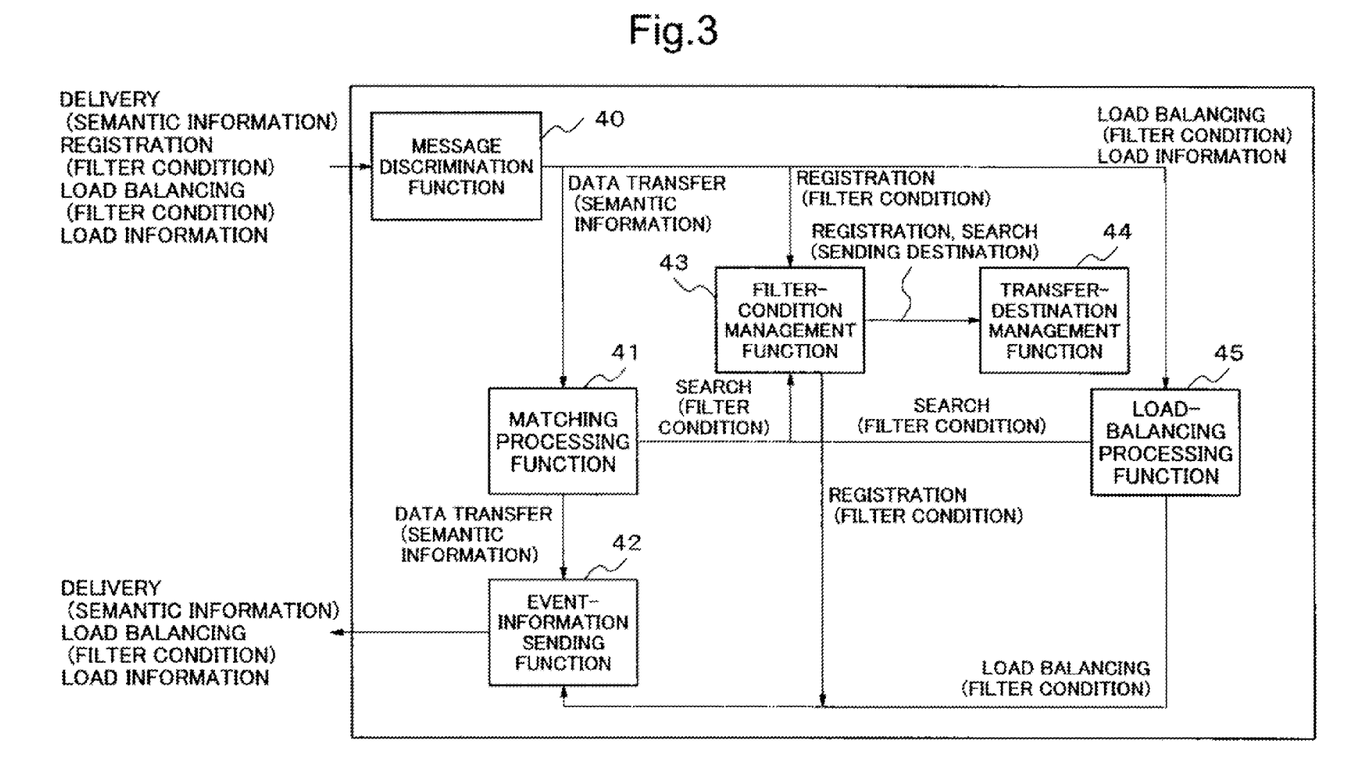
FIG. 3 is a block diagram showing the functional configuration of a broker node according to a first exemplary embodiment of the present invention.

The broker nodes 20-28 have respective functions to perform the predetermined processing of the semantic information sent from the sensor nodes 10-15. FIG. 3 is a block diagram showing the functional configuration of the broker nodes in the first embodiment. As shown in FIG. 3, the broker nodes 20-28 comprises a message discrimination function 40, matching processing function 41, event-information sending function 42, filter-condition management function 43, transfer-destination management function 44 and load-balancing processing function 45.

The message discrimination function 40 recognizes the message category of the delivery messages, filter-condition registration messages and load-balancing messages which are sent from other broker nodes and sensor nodes. Here, the delivery message is the message for delivering semantic information, and filter-condition registration message is that for propagating a filter condition, and the load-balancing message is that for executing a load-balancing process. Additionally, the load-information message is the message for notifying the load information of individual broker node.

When this broker node receives a filter-condition registration message, the filter condition is passed to the filter-condition management function 43, and is registered. Then, the filter-condition management function 43 registers the sending origin of this registration message, as the transfer destination of event information, in the transfer-destination management function 44. In the case of a flooding process mentioned above, this filter condition is transferred, as a registration message, to the next neighboring broker nodes via the event-information sending function 42. At that moment, if the neighboring node is a sensor node emitting the semantic information satisfying the filter condition, this filter condition is set.

When the broker node receives a delivery message, the semantic information on delivery is transferred to the matching processing function 41. Then, the matching processing function 41 makes inquiries about the filter condition for this semantic information on delivery to the filter-condition management function 43. Then, the filter-condition management function 43 performs a search for the filter condition and also obtains the transfer destination for the relevant filter condition from the transfer destination management function 44. When one or more filter conditions are found in the search, the matching processing function 41 performs a comparison process. If the semantic information matches the filter conditions, the matching processing function 41 performs the data transfer of the semantic information along with the transfer-destination information to the event-information sending function 42. Then, the event-information sending function 42 sends the semantic information to the designated transfer destination as a delivery message.

When the broker node has received a load-balancing message, the load balancing message is passed to the load-balancing processing function 45. Then, the load-balancing processing function 45 makes inquiries to the filter-condition management function 43, in order to determine whether its own node holds or not the filter condition described in the received load-balancing message. If its own node holds a condition identical with the received filter condition, and also the filter condition is already set, the load-balancing processing function 45 executes the procedure of load balancing described below. If the filter condition is not set, a load-balancing message is sent to the resultantly obtained transfer destination.

When the broker node has received a load-information message of a specific broker node, the load-balancing processing function 45 sends the load information to the transfer destination indicated by this message via the event-information sending function 42.

Although all the sensor nodes 10-12 and all the sensor nodes 13-15 generate the semantic information relevant to event A and event B, respectively, the generated patterns differ from each other due to the difference in the installation sites of the sensor nodes. As a result, for example, the difference may arise between the number of the pieces of semantic information generated by the sensor node 10 within a certain period of time and the number of the pieces of semantic information generated by the sensor nodes 11 and 12.

Here, it is assumed that, in FIG. 2, the number of the pieces of semantic information generated by the sensor node 10 within a certain period of time has become large, and consequently the broker node 20 has entered a high-load state. The broker node 20, which has entered a high-load state, firstly identifies the semantic-information delivery causing the high-load state. The semantic information causing the high-load state can be identified by referring to its template information. Then, the filter condition relevant to the semantic-information delivery causing the high-load state is identified. Here, it is possible that a plurality of filter conditions match for one semantic-information delivery.

Figure 4:
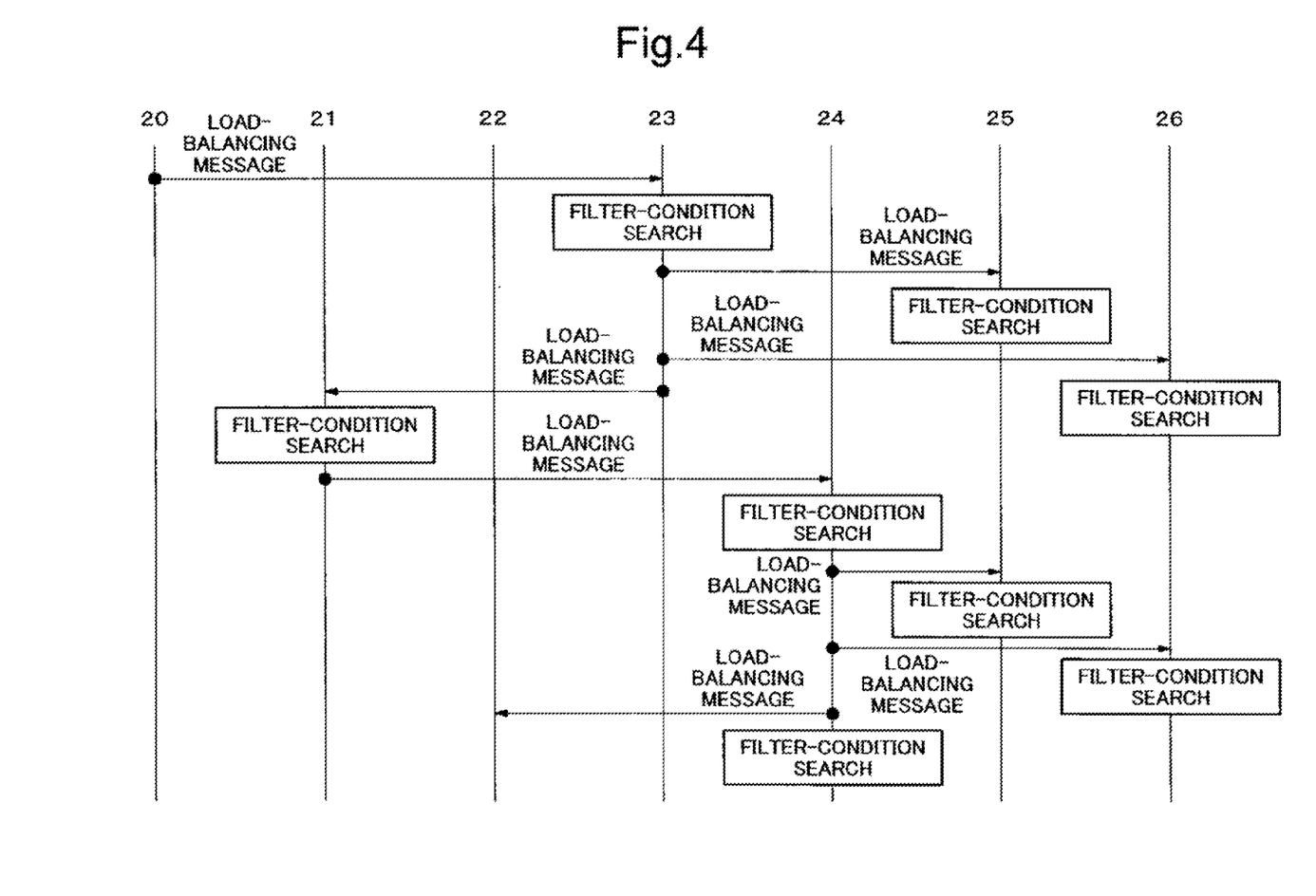
FIG. 4 is a sequence diagram showing an operation for propagating a filter condition in a first exemplary embodiment of the present invention.

After that, the broker node 20, which has entered a high-load state, identifies a destination for load balancing. The procedure of this load balancing is shown in FIG. 4. The broker node 20 transfers the identified filter condition to the neighboring broker node 23 as a load-balancing message.

In the broker node 23 which has received the load-balancing message, the load-balancing processing function 45 executes the processing of the received load-balancing message as described above, and further transfers the load-balancing message to the neighboring broker nodes 21, 25 and 26. Subsequently, in a similar way, the information about the filter condition emitted by the broker node 20 is propagated to the broker nodes 21-28. While it is indicated specifically concerning the broker nodes 20-26 in FIG. 4, the filter condition is propagated also to the broker nodes 27 and 28 from the broker nodes 25 and 26, respectively.

Among the broker nodes 21-28 to which the above-mentioned filter condition has been propagated, the broker nodes 23-28 do not accommodate either of the sensor nodes 11 and 12 generating the semantic information relevant to event A. In these broker nodes, only the operation for propagating the filter condition is executed.

Figure 5:
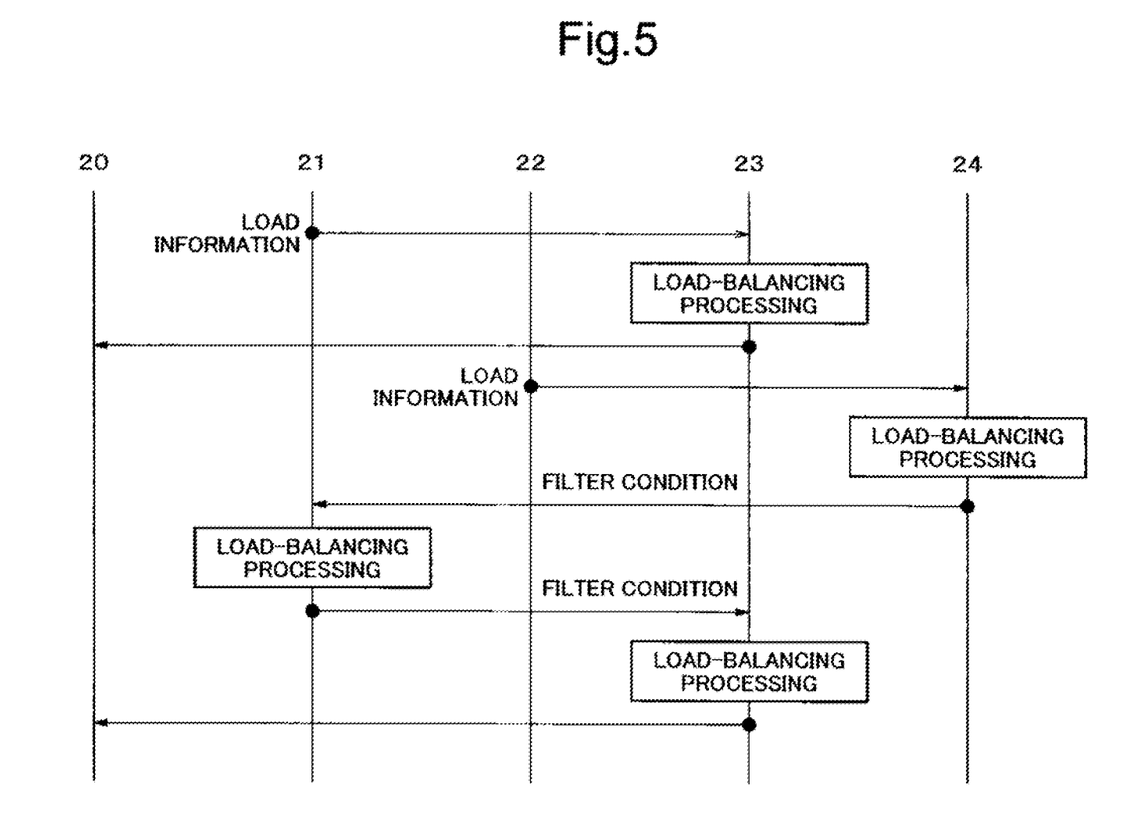
FIG. 5 is a sequence diagram showing an operation of the load balancing processing in a first exemplary embodiment of the present invention.

On the other hand, the broker nodes 21 and 22 accommodating the sensor nodes 11 and 12 generating the semantic information relevant to event A, respectively, notify the identifiers and the load information (average CPU utilization, for example) of their own broker nodes to the broker node 20. This notification is performed, for example, by the routes shown in FIG. 5. That is, the load information sent from the broker node 21 is notified to the broker node 20 via the broker node 23. Similarly, the load information sent from the broker node 22 is notified to the broker node 20 via the broker nodes 24, 21 and 23.

By the above-mentioned processing, the load information for the broker nodes 21 and 22, which are listed in FIG. 2 as the broker nodes receiving the semantic information relevant to event A, is integrated to the broker node 20 which is in a high-load state. Subsequently, the broker node 20 can select an edge node in the lowest load state from the list, for example, and determine the node as the destination of a node switching concerning the semantic-information delivery causing the high-load state.

As an alternative way, by selecting a plurality of low-load broker nodes and further determining the proportions of the load to be distributed to these nodes, it becomes possible to distribute the load to the plurality of low-load broker nodes.

Then, the broker node 20 notifies the sensor node 10 of the information about the broker node becoming the destination of the node switching. For example, the address of the edge node becoming the destination of the node switching is notified.

Here, assuming that the broker node 21 is the destination of the node switching, the sensor node 10 switches the sending destination of the semantic information relevant to event A from the broker node 20 to the broker node 21, after receiving the information on the destination of the node switching.

Undergoing the above-described processing, the broker node 20 comes to receive no semantic information relevant to event A from the sensor node 10, which was the cause of the high-load state, and consequently can avoid the high-load state.

[The Fourth Exemplary Embodiment]

Recently, by an introduction of virtualization technology, it has become possible to operate a plurality of virtual equipments on one physical equipment. As the fourth embodiment of the present invention, an example of a sensor network system wherein the present invention is applied to a virtualization system will be described.

Figure 6:
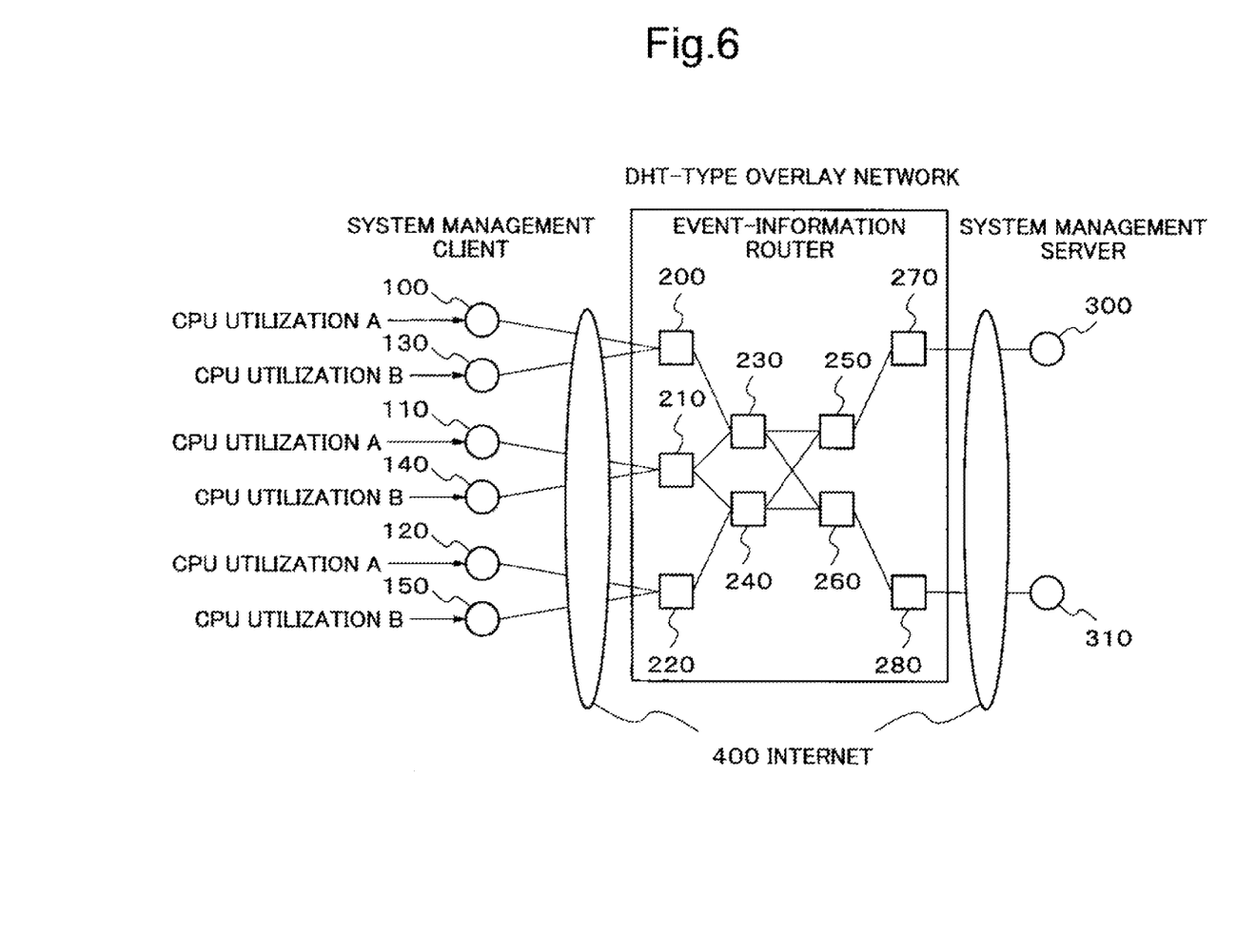
FIG. 6 is a diagram showing a configuration of a sensor network system (virtualization system) according to a second exemplary embodiment of the present invention.

FIG. 6 is a diagram indicating the configuration of a sensor network system according to the fourth embodiment. In this fourth embodiment, the present invention is applied specifically to the monitoring of CPU (Central Processing Unit) utilization. System management clients 100-150 are the applications for monitoring respective virtual equipments. Among these applications, the system management clients 100-120 are monitoring the CPU utilization of three different virtual equipments belonging to system A. And, the system management clients 130-150 are monitoring the CPU utilization belonging to system B.

The system management clients 100-150 access a DHT (Distributed Hash Table)-style overlay network via an internet 400. The connection via the internet is just an example, and the third generation mobile networks are mentioned as an alternative way. In addition, the connection to the DHT-type overlay network is made with the use of TCP (Transmission Control Protocol), UDP (User Datagram Protocol) or HTTP (Hyper Text Transfer Protocol).

In the fourth embodiment, the semantic information is described in the XML (Extensible Markup Language) format as the event information which is emitted when a change in the state (event) occurs. A schema of XML is a template for event information, and the content of event information is designated by describing individual element or attribute information included in the template. For example, by defining the schema named "System condition" and preparing the elements named "System A" and "System B" in the schema, the event information for system A and that for system B are distinguished from each other. Further, the monitoring target is specified in more detail by further describing the elements of CPU class, CPU utilization, name of virtual equipment, IP (Internet Protocol) address and the like. The numerical data of the measured CPU utilization is treated as the data contained in the above-mentioned element of CPU utilization. In FIG. 6, the information on CPU utilization is specifically illustrated.

By the use of the above-mentioned configuration, the reality of semantic information relevant to individual piece of CPU information is created, and moreover, the event information is generated at a rate of one piece per second, for example.

The event information routers in FIG. 6 operate as an application on the overlay network nodes configured with DHT. Each event information router holds a node ID for identifying each node on the DHT. Then, using the above-mentioned node IDs, the event information routers here performs the routing of the messages described in the XML format as concrete examples of semantic information.

A system management server 300 is the recipient of the information on CPU utilization measured by the three virtual equipments belonging to system A. And, a system management server 310 is the recipient of the information on CPU utilization measured by the three virtual equipments belonging to system B. The system management servers 300 and 310 generate a filter condition in the X-path expression to receive only the event information they need to, and register it in event-information routers 270 and 280, respectively. This filter condition is propagated to other event-information routers by a procedure similar to that in the third embodiment described above.

When transferring the filter conditions in X-path format to neighboring broker nodes, the event-information routers 200-280 add the IDs of their own nodes. This information is utilized as the information on transfer destination, when the neighboring event-information routers received the event information matching the filter conditions.

There is also an integration-type propagation of the event information, as a more advanced method. In this method, when a plurality of filter conditions are set for one event, the event-information routers 200-280 detect the set filter conditions in terms of output ports. Further, it is a model wherein it is defined that the propagation of event information is performed by the use of the port holding larger number of filter conditions (capable of transferring multiple kinds of event information), among the ports holding the filter conditions relevant to the corresponding event information, and the propagation using the port holding smaller number of filter conditions is stopped.

By the above-mentioned process, delivery paths for transferring event information are set over the event-information routers 200-280.

Figure 7:
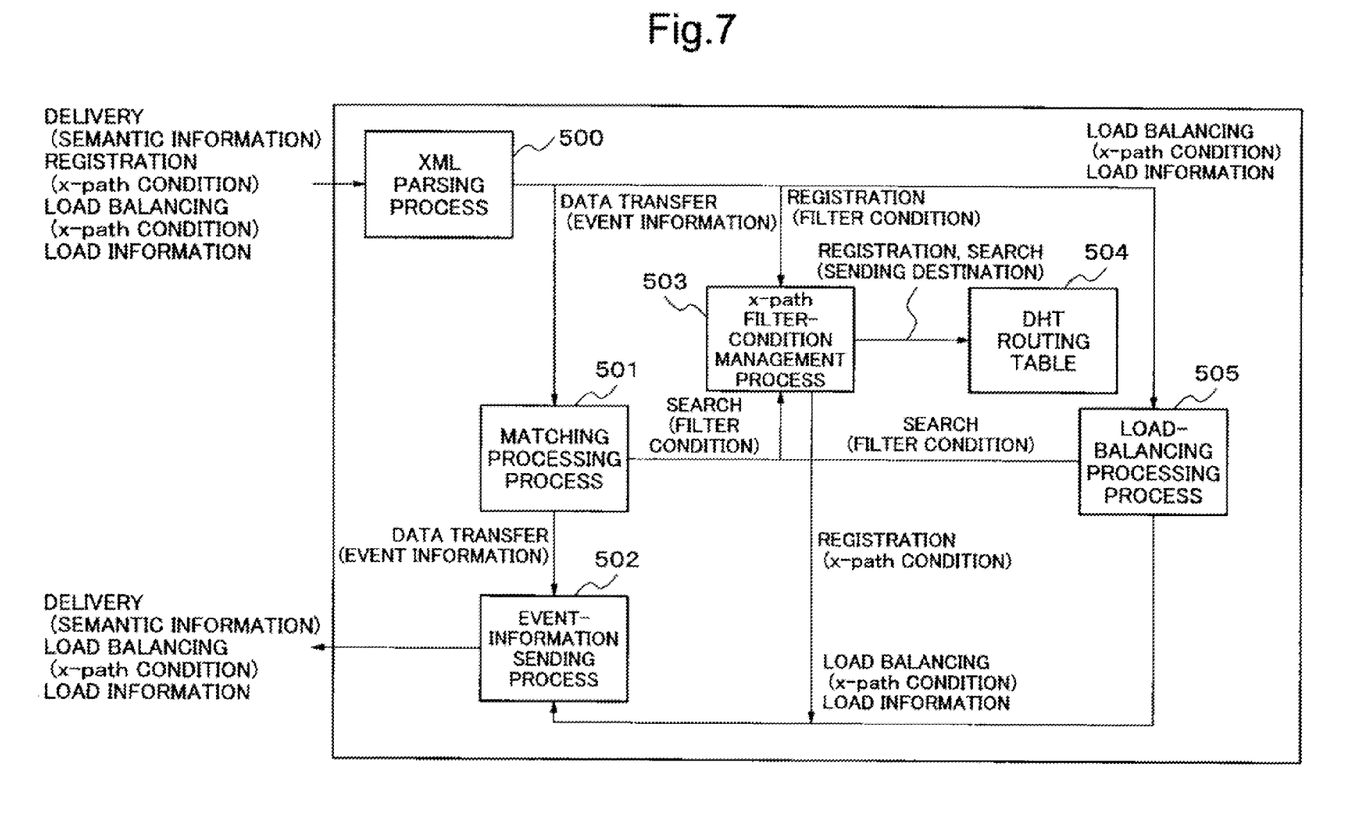
FIG. 7 is a block diagram showing a functional configuration of a broker node (event information router) according to a second exemplary embodiment of the present invention.

The configuration of the event-information routers 200-280 illustrated in FIG. 7 is basically similar to that in the third embodiment described above. Individual function is realized by an application process. An XML Parsing process 500 transforms the received XML messages into that in a tree format, recognizes the category of each message, and performs a data transfer to an appropriate process.

When this event-information router has received a registration message containing an X-path filter condition, the condition is passed to a filter-condition management process 503, and is registered. Then, the filter-condition management process 503 registers the DHT-node ID for the sending origin of this registration message, as the transfer destination of event information, in a DHT routing table 504. After finishing these processes, the X-path condition is transferred as a registration message to the next neighboring event-information router via an event-information sending process 502. At that moment, if the neighboring event-information router is a system management client emitting the event information satisfying the X-path condition, this X-path condition is set.

When the event-information router has received the event information, the data of the event information is transferred to a matching processing process 501. Then, the matching processing process 501 makes inquiries about the X-path filter condition for this event information to the X-path filter-condition management process 503. Then, the X-path filter-condition management process 503 performs a search for the X-path filter condition, and also obtains the DHT-node ID of the transfer destination for the event information matching the above-mentioned X-path filter condition from the DHT routing table 504. When one or more X-path filter conditions are found in the search, the matching processing process 501 performs a comparison process. If the event information matches the filter conditions, the matching processing process 501 passes the delivery message to the event-information sending process 502. Finally, the event-information sending process 502 sends the event information to the designated DHT node as a delivery message.

When the event-information router received a load-balancing message, the load balancing message is passed to a load-balancing processing process 505. Then, the load-balancing processing process 505 makes inquiries to the X-path filter-condition management process 503, in order to determine whether its own node holds the received X-path filter condition or not. If its own node holds a filter condition identical with the received X-path filter condition, and also the filter condition is already registered, the load-balancing processing process 505 executes the procedure of load balancing described below. If the filter condition is not registered, a load-balancing message is sent to the event-information router having the resultantly obtained DHT-node ID.

When the event-information router received a load-information message, the load-balancing processing process 505 sends the load information to the DHT node indicated by the DHT-node ID via the event-information sending process 502.

The system management clients 100-120 generate the event information relevant to the CPU utilization of the virtual equipments belonging to system A, and the clients 130-150 generate the event information relevant to the CPU utilization of the virtual equipments belonging to system B. However, the generated patterns differ from each other due to the difference in the installation sites. As a result, for example, the difference may arise between the number of the pieces of semantic information generated by the system management client 100 within a certain period of time and the number of the pieces of semantic information generated by the system management client 110 and 120.

Here, it is assumed that, in FIG. 6, the number of the pieces of event information generated by the system management client 100 within a certain period of time has become large, and consequently the event information router 200 has entered a high-load state. The event information router 200, which has entered a high-load state, firstly identifies the sending origin of the event information causing the high-load state. Then, the X-path filter condition relevant to the event-information delivery causing the high-load state is identified. As it is possible that a plurality of filter conditions match one event-information delivery, the number of identified X-path filter conditions may be more than one. Then, the event information router 200 transfers the identified X-path filter condition to the neighboring event information router 230.

This procedure for propagating the X-path filter condition is similar to that in the third embodiment described above. That is, the event information router 230 transfers the filter condition to the neighboring event information routers 210, 250 and 260. In a similar way, the information of the filter condition generated by the event information router 200 is propagated to the event information routers 210-280.

Among the event information routers 210-280, the event routers 230-280 do not accommodate either of the system management clients 110 and 120 generating the event information relevant to the CPU utilization of the virtual equipments belonging to system A, and hence executes only the above-described propagation operation.

On the other hand, the event information routers 210 and 220 respectively accommodate the system management clients 110 and 120 generating the event information relevant to the CPU utilization of the virtual equipments belonging to system A. Accordingly, the event information routers 210 and 220 notify the DHT-node ID and the load information (average CPU utilization, for example) of their own event information routers to the event information router 200.

By the above-mentioned processing, the load information of the event information routers receiving the CPU utilization of the virtual equipments belonging to system A is integrated to the event information router 200. In FIG. 6, the event information routers 210 and 220 are recognized by the event information router 200. Then, by selecting the event information router in the lowest load state from the list of integrated load information, for example, the event information router 200 can determine this event information router as the destination of a switching of the event information flow causing the high load state.

As an alternative method, by selecting a plurality of low-load event information routers and further determining the proportions of the load to be distributed to those routers, it becomes possible to distribute the load to the plurality of low-load event information routers.

Then, the event information router 200 notifies the system management client 100 of the access information, such as the IP address, for the event information router becoming the destination of the flow switching.

Here, assuming that the event information router 210 is the destination of the flow switching, the system management client 100 switches the sending destination of the CPU utilization of the virtual equipment belonging to system A from the event information router 200 to the event information router 210, after receiving the information on the destination of the flow switching.

Undergoing the above-described processing, the event information router 200 comes to receive no CPU utilization information on the virtual equipment belonging to system A from the system management client 100, which was the cause of the high-load state, and consequently can avoid the high-load state.

Additionally, the above-described embodiments are the exemplary embodiments of the present invention, but do not limit the present invention to only these embodiments, and the present invention may be embodied in several forms with various changes without departing from the scope of the present invention. For example, the present invention can be applied to the use for monitoring the operation conditions of large scale network systems. That is, by describing various changes in the situation which occur in a network system as semantic information or event information, application of advanced system-operation information becomes realizable. In the same way, by promoting the description of other environmental information and traffic information, cross-sectional information application during the mutual utilization of various systems for monitoring the real space becomes possible.

Furthermore, the programs executed at the broker nodes and event information routers in the above-described embodiments are in the form of module configuration including respective units (acquired-information discrimination unit 5, filter-condition management unit 6, load-balancing processing unit 7) described above. Then, by the use of actual hardware, the message discrimination function 40, filter-condition management function 43, load-balancing processing function 45, XML Parsing process 500, X-path filter-condition management process 503 and load-balancing processing process 505 and the like are realized. That is, by a computer's (CPU's) retrieving the programs from a predetermined recording medium and executing them, each of the above-mentioned means is loaded in the main storage unit and generated.

The programs executed by the broker nodes in the present exemplary embodiments may be configured so as to be stored in a computer connected to a network such as internet and be provided through downloading via the network. Further, the above-mentioned programs may be configured so as to be provided or delivered via a network such as internet.

Furthermore, the above-mentioned programs may be configured so as to be recorded in a computer-readable recording medium as the files in installable or executable format and be provided thereby. As the recording medium, for example, a floppy (registered trademark) disk, hard disk, optical disc, magneto-optical disk, CD-ROM, CD-R, DVD and non-volatile memory card are mentioned. In addition, the above-mentioned programs may be configured so as to be provided being embedded in a ROM or the like.

In this case, the program codes retrieved from the above-mentioned recording medium or loaded via a communication network and then executed realize the functions in the above-described embodiments themselves. Thereby, the recording medium wherein the program codes are recorded configures the present invention.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2009-068900, filed on Mar. 19, 2009, the disclosure of which is incorporated herein in its entirety by reference.

INDUSTRIAL AVAILABILITY

In addition to the above-mentioned embodiments, the present invention can be applied also to the use for monitoring the operation conditions of large scale network systems. For example, it can be applied to a system which makes it realizable to describe various changes in the situation occurring in a network system as semantic information or event information, and thereby utilize the advanced system-operation information. It can be applied also to a system which makes it realizable to utilize information cross-sectionally during the mutual utilization of various systems for monitoring the real space, by promoting the description of other environmental information and traffic information.

[Description of Symbols]
1 sensor network system.
2, 10-15 sensor node
3, 20-28 broker node
4, 30, 31 service node
5 acquired-information discrimination unit
6 filter-condition management unit.
7 load-balancing processing unit.
40 message discrimination function.
41 matching processing function.
42 event-information sending function.
43 filter-condition management function.
44 transfer-destination management function.
45 load-balancing processing function.
100-150 system management client
200-280 event information router
300, 310 system management server.
500 XML Parsing process
510 matching processing process.
520 event-information sending process.
530 X-path filter-condition management process
540 DHT routing table
550 load-balancing processing process.

The invention claimed is:

1. A sensor network system comprising:
a sensor node which generates semantic information by applying sensed numerical data to a defined information format;
a broker node which transfers the semantic information generated by said sensor node; and
a server node which registers a filter condition for acquired semantic information in said broker node, wherein
the sensor network system identifies the filter condition associated with a specific event causing said high-load state by the use of the filter condition for semantic information which is register when said broker node which accommodates said sensor node becomes a high-load state and searches for another broker node, and is capable of transferring the semantic information which has been transferred by said high-load broker node and switches the accommodation relationship with said sensor node from said high-load broker node to said low-load broker node,
wherein the another broker node that is searched for has a plurality of characteristics, including:
a first characteristic of having the filter condition related to the event that is causing the high-load state; and
a second characteristics of being in low-load state,
and wherein said broker node acquires control information relevant to load-balancing from said another high-load broker node, and searches for a filter condition matching the filter condition contained in said control information, and sends its own identification information and load information to the broker node when a matching filter condition is found.

2. The sensor network system according to claim 1, wherein said broker node comprises:
an acquired-information discrimination unit implemented at least in hardware and that discriminates the content of information acquired from other nodes;
a filter-condition management unit implemented at least in hardware and that registers filter condition, when said acquired-information discrimination unit discriminates said content of acquired information as control information relevant to filter-condition registration; and
a load-balancing processing unit implemented at least in hardware and that sends control information relevant to load-balancing to other broker nodes when a high-load state has occurred, and for performs a load-balancing process of making said sensor node switch the sending destination of the generated semantic information, by searching for said low-load broker nodes having the same filter condition as that of said high-load broker node by the use of the filter condition which said filter-condition management unit registered, when said acquired-information discrimination unit discriminates said content of acquired information as control information relevant to load-balancing.

3. The sensor network system according to claim 1, wherein
when said broker node becomes high-load due to an increase of semantic information generated in a certain period of time by sensor nodes accommodated by said broker node, said broker node identifies the flow of semantic information causing said high-load state and the filter condition for said flow of semantic information, and include said filter condition in control information relevant to load-balancing and then sends said filter condition to other broker nodes.

4. The sensor network system according to claim 1, wherein
said broker node receives load information from other broker nodes having the same filter condition as that for the semantic information which causes high load, and from among said other broker nodes, selects a broker node to be assigned as a new accommodation destination for the sensor node generating said semantic information which causes high load.

5. The sensor network system according to claim 1, wherein
when said sensor node is instructed about the connection information for said low-load broker node which is to be a new accommodation destination and the semantic information to be the subject of the change of connection destination by said high-load broker node which is present accommodate destination, said sensor node switches the sending destination of said semantic information from said high-load broker node to said low-load broker node.

6. A broker node constituting a sensor network system together with a sensor node for generating semantic information by applying sensed numerical data to a defined information format, and with a server node for registering a filter condition for acquired semantic information in a broker node, wherein the broker node comprising:
an acquired-information discrimination unit implemented at lest in hardware and that discriminates the content of information acquired from other nodes;
a filter-condition management unit implemented at least in hardware and that registers a filter condition, when said acquired-information discrimination unit discriminates said content of acquired information as control information relevant to filter-condition registration; and a load-balancing processing unit implemented at least in hardware and that sends control information relevant to load-balancing to other broker nodes when a high-load state has occurred, and for performing a load-balancing process of making said sensor node switch the sending destination of the generated semantic information, by searching for another broker node by the use of the filter condition which said filter-condition management unit registered, when said acquired-information discrimination unit discriminates said content of acquired information as control information relevant to load-balancing, wherein said load-balancing processing unit identifies the filter condition for semantic information associated with a specific event causing said high-load state, and the searches for said another low-load-state broker node having the filter condition for the semantic information associated with said specific event causing the high-load state, wherein the another broker node that is searched for has a plurality of characteristics, including:
  a first characteristics of having the filter condition related to the event that is causing the high-load sate; and
  a second characteristic of being in low-load state, and wherein said load-balancing processing unit acquires control information relevant to load-balancing from said another high-load broker node, and searches for a filter condition matching the filter condition contained in said control information, and sends its own identification information and load information to the broker node when a matching filter condition is found.

7. The broker node according to claim 6, wherein
when said broker node becomes high-load due to an increase of semantic information generated in a certain period of time by sensor nodes accommodated by said broker node, said load-balancing processing unit identifies the flow of semantic information causing said high-load state and the filter condition for said flow of semantic information, and include said filter condition in control information relevant to load-balancing and then sends said filter condition to other broker nodes.

8. The broker node according to claim 6, wherein
said load-balancing processing unit receives load information from other broker nodes having the same filter condition as that for the semantic information which causes high load, and from among said other broker nodes, selects a broker node to be assigned as a new accommodation destination for the sensor node generating said semantic information which causes high load.

9. The broker node according to claim 6, wherein
said load-balancing processing unit instructs accommodated said sensor node about the connection information for said low-load broker node which is to be a new accommodation destination and the semantic information to be the subject of the change of connection destination, and makes said sensor node switch the sending destination of said semantic information.

10. A sensor node which generates semantic information by applying sensed numerical data to a defined information format, and constitutes a sensor network system together with a broker node which transfers the generated semantic information and with a server node which registers a filter condition for acquired semantic information in said broker node, wherein, when instructed by high-load broker node which is the present accommodation, about the connection information to another broker node capable of transferring the semantic information which has been transferred by said high-load broker node, and is searched for by the use of the filter condition which is registered, and about the semantic information to be the subject of the change of connection destination, said sensor node switches the sending destination of said semantic information from said high-load broker node to said low-load broker node, wherein the sensor node identifies the filter condition associated with the specific event causing said high-load state, and searches for said another low-load state broker node having the filter condition associated with said specific event causing the high-load state, wherein the another broker node that is searched for has a plurality of characteristics, including:
  a first characteristic of having the filter condition related to the event that is causing the high-load state; and
  a second characteristic of being in low-load state, and wherein said broker node acquires control information relevant to load-balancing from said another high-load broker node, and searches for a filter condition matching the filter condition contained in said control information, and sends its won identification information and load information to the broker node when a matching filter condition is found.

11. A method of load-balancing utilized in a sensor network system which comprises a sensor node which generates semantic information by applying sensed numerical data to a defined information format, a broker node which transfers the semantic information generated by said sensor node, and a server node which registers a filter condition for acquired semantic information in said broker node, wherein the sensor network system identifies the filter condition associated with a specific event causing said high -load state by the use of the filter condition for semantic information which is registered when said broker node which accommodates said sensor node becomes a high-load state and searches for another broker node, and is capable of transferring the semantic information which has been transferred by said high-load broker node, and switches the accommodation relationship with said sensor node from said high-load broker node to said low-load broker node, wherein the another broker that is searched for has a plurality of characteristics, including:
  a first characteristic of having the filter condition related to the event that is causing the high-load sate; and
  a second characteristics of being in low-load state, and wherein said broker node acquires control information relevant to load-balancing from said another high-load broker node, and searches for a filter condition matching the filter condition contained in said control information, and sends its own identification information and load information to the broker node when a matching filter condition is found.

12. The method of load-balancing according to claim 11, comprising:
sending the control information relevant to a load-balancing to other broker nodes, when said broker node becomes high-load due to the semantic information generation of sensor nodes accommodated;
discriminating the content of information acquired from other nodes;
registering a filter condition, when said content of acquired information is discriminated as control information relevant to a filter-condition registration;

searching for said broker nodes, when said content of acquired information is discriminated as control information relevant to a load-balancing; and making said sensor node switch the sending destination of generated semantic information, by notifying searched low-load broker node to accommodating sensor node, wherein the broker node that are searched for have a plurality of characteristic, including:
  a first characteristic of having the filter condition related to the event that is causing the high-load state; and
  a second characteristic of being in low-load state.

13. A non-transitory computer-readable recording medium storing a program utilized in a sensor network system which comprises a sensor node which generates semantic information by applying sensed numerical data to a defined information format, a broker node which transfers the semantic information generated by said sensor node, and a server node which registers a filter condition for acquired semantic information in said broker node, wherein
  the program makes a computer in said broker node, when said broker node which accommodates said sensor node becomes a high-load state, by the use of the filter condition which is registered, execute the steps of searching for another broker node capable of transferring the semantic information which has been transferred by said high-load broker node, and of switching the accommodation relationship with said sensor node from said high-load broker node to said low-load broker node,
  wherein the program identifies the filter condition associated with a specific event causing said high-load state, and searches for said another low-load-state broker node having the filter condition associated with said specific event causing the high load state,
  wherein the another broker that is searched for has a plurality of characteristics, Including:
    a first characteristic of having the filter condition related to the event that is causing the high-load state; and
    a second characteristics of being in low-load state,
  and wherein said broker node acquires control information relevant to load-balancing from said another high-load broker node, and searches for a filter condition matching the filter condition contained in said control information, and sends its own identification information and load information to the broker node when a matching filter condition is found.

14. The non-transitory computer-readable recording medium according to claim 13, wherein the program further makes a computer in said broker node execute:
  a load-balancing information sending process for sending the control information relevant to a load-balancing to other broker nodes, when said broker node becomes high-load due to the semantic information generation of sensor nodes accommodated by said broker node;
  an acquired-information discrimination process for discriminating the content of information acquired from other nodes;
  a filter-condition management process for registering a filter condition, when said content of acquired information is discriminated in said acquired-information discrimination process as control information relevant to a filter-condition registration;
  a low-load node search process for searching for said low-load broker nodes having the same filter condition as that of said high-load broker node by the use of the filter condition registered in said filter-condition management process, when said content of acquired information is discriminated in said acquired-information discrimination step as control information relevant to a load-balancing; and
  a load-balancing process for notifying said low-load broker node identified in said low-load node search process to said sensor node which is accommodated, and for making said sensor node switch the sending destination of generated semantic information.

\* \* \* \* \*